United States Patent
Kuo et al.

(10) Patent No.: US 10,474,293 B2
(45) Date of Patent: Nov. 12, 2019

(54) SIGNAL PROCESSING METHOD AND TOUCH SENSING SYSTEM USING THE SAME

(71) Applicant: NOVATEK Microelectronics Corp., Hsin-Chu (TW)

(72) Inventors: Hung-Cheng Kuo, Hsinchu (TW); Yung-Fu Lin, Hsinchu County (TW); Chun-Hung Chen, Taipei (TW); Ting-Hsuan Hung, Taichung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 82 days.

(21) Appl. No.: 15/726,404

(22) Filed: Oct. 6, 2017

(65) Prior Publication Data
US 2019/0107916 A1   Apr. 11, 2019

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .................................. G06F 3/0418; G06F 3/044
See application file for complete search history.

(56) References Cited

U.S. PATENT DOCUMENTS

| | | | |
|---|---|---|---|
| 2005/0109125 A1* | 5/2005 | Hall | G01D 5/2405 73/862.68 |
| 2008/0158167 A1* | 7/2008 | Hotelling | G06F 3/0416 345/173 |
| 2008/0158178 A1* | 7/2008 | Hotelling | G06F 3/044 345/173 |
| 2009/0127005 A1* | 5/2009 | Zachut | G06F 3/0418 178/18.03 |
| 2011/0042152 A1* | 2/2011 | Wu | G06F 3/0416 178/18.03 |
| 2011/0063993 A1* | 3/2011 | Wilson | G06F 3/044 370/254 |
| 2013/0207906 A1* | 8/2013 | Yousefpor | G06F 3/0418 345/173 |
| 2014/0145734 A1* | 5/2014 | Lin | G01R 27/2605 324/684 |
| 2014/0198053 A1* | 7/2014 | Yoon | G06F 3/0416 345/173 |
| 2015/0062080 A1* | 3/2015 | Kang | G06F 3/0416 345/174 |
| 2015/0138115 A1* | 5/2015 | Jang | G06F 3/0418 345/173 |

* cited by examiner

*Primary Examiner* — Mihir K Rayan
(74) *Attorney, Agent, or Firm* — Winston Hsu

(57) ABSTRACT

A signal processing method for a touch panel includes transmitting a first driving signal to a first touch channel of the touch panel; and transmitting a second driving signal to a second touch channel of the touch panel, wherein the second touch channel is neighboring to the first touch channel. The first driving signal is substantially identical to the second driving signal during a first period, and the first driving signal is substantially inverse to the second driving signal during a second period neighboring to the first period.

16 Claims, 11 Drawing Sheets

SIGNAL PROCESSING METHOD AND TOUCH SENSING SYSTEM USING THE SAME

BACKGROUND OF THE INVENTION

1. Field of the Invention

The present invention relates to a signal processing method and a touch sensing system, and more particularly, to a signal processing method for noise cancellation in a touch sensing system and the touch sensing system using the signal processing method to obtain touch sensing results.

2. Description of the Prior Art

In recent years, touch sensing technology advances rapidly, and many consumer electronic products such as mobile phones, GPS navigator systems, tablets, personal digital assistants (PDA) and laptops are equipped with touch sensing functions. In various electronic products, touch sensing functions are included in a display area which originally had only display functions. In other words, an original display panel is replaced by a touch panel having both display and touch sensing functions. The touch panel can generally be divided into out-cell, in-cell and on-cell touch panel according to the difference in structure of the touch panel. The out-cell touch panel is composed of an independent touch panel and a general display panel. In the in-cell or on-cell touch panel, a touch sensing device is directly disposed on the inside or outside of a substrate in the display panel, respectively.

Touch sensing techniques can be classified into a resistive type, capacitive type and optical type. The capacitive type touch panels became popular gradually since they have many advantages such as high sensing accuracy, high transparency, high reaction speed and long life. In the capacitive type touch sensing technique, capacitance variations due to a touch event are detected to realize touch detection. However, the capacitance values on a touch panel are always influenced by noise, which may reduce the accuracy of touch detection.

Larger noises (i.e., noises with larger magnitudes) usually occur on a touch panel when the electronic device including the touch panel is on charge. The charging currents may generate large vibrations on power and ground signals of the electronic device. If there is no touch signal received, the power and ground signals may possess similar vibration patterns and thereby be constant relative to each other. When a user touches the touch panel of the electronic device on charge, a global ground signal from the user may enter the touch panel with the touch finger. This global ground may generate large noise interference since the vibrating power signals have large variations relative to the global ground; hence, large noise interference may be resulted from the touch event.

Thus, it is important to mitigate or even eliminate the influences of the large noise interference, in order to achieve a preferable touch sensing performance.

SUMMARY OF THE INVENTION

It is therefore an objective (but not limited) of the disclosure to provide a signal processing method for noise cancellation in a touch sensing system, which can apply differential driving and sensing schemes to mitigate or eliminate noises generated from the touch panel of the touch sensing system.

An embodiment of the present invention discloses a signal processing method for a touch panel. The signal processing method comprises transmitting a first driving signal to a first touch channel of the touch panel; and transmitting a second driving signal to a second touch channel of the touch panel, wherein the second touch channel is neighboring to the first touch channel. The first driving signal is substantially identical to the second driving signal during a first period, and the first driving signal is substantially inverse to the second driving signal during a second period neighboring to the first period.

An embodiment of the present invention further discloses a touch sensing system. The touch sensing system comprises a touch panel, a first driver, a second driver and a differential receiver. The touch panel comprises a first touch channel and a second touch channel neighboring to the first touch channel. The first driver, coupled to the touch panel, is used for transmitting a first driving signal to the first touch channel to generate a first sensing signal. The second driver, coupled to the touch panel, is used for transmitting a second driving signal to the second touch channel to generate a second sensing signal. The differential receiver, coupled to the touch panel, is used for receiving the first sensing signal from the first touch channel and receiving the second sensing signal from the second touch channel, to obtain a touch sensing result by subtracting the second sensing signal from the first sensing signal. The first driving signal is substantially identical to the second driving signal during a first period, and the first driving signal is substantially inverse to the second driving signal during a second period neighboring to the first period.

An embodiment of the present invention further discloses a signal processing method for a touch panel. The signal processing method comprises transmitting a first driving signal to a first touch channel of the touch panel; and transmitting a second driving signal to a second touch channel of the touch panel, wherein the second touch channel is neighboring to the first touch channel. The first driving signal and the second driving signal have different phases during a first period.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, the larger noises interfering with touch detection on the touch panel may be generated by charging currents. Such noises may appear when the user finger touches the touch panel, and are not easily avoided during touch sensing operations. Fortunately, the noises appearing on two neighboring points of the touch panel usually have high correlation; hence, the present invention may transmit differential driving signals to two neighboring touch channels of the touch panel, receive touch sensing signals from the two neighboring touch channels, and then subtract the touch sensing signals to remove the noise interference.

Figure 1:
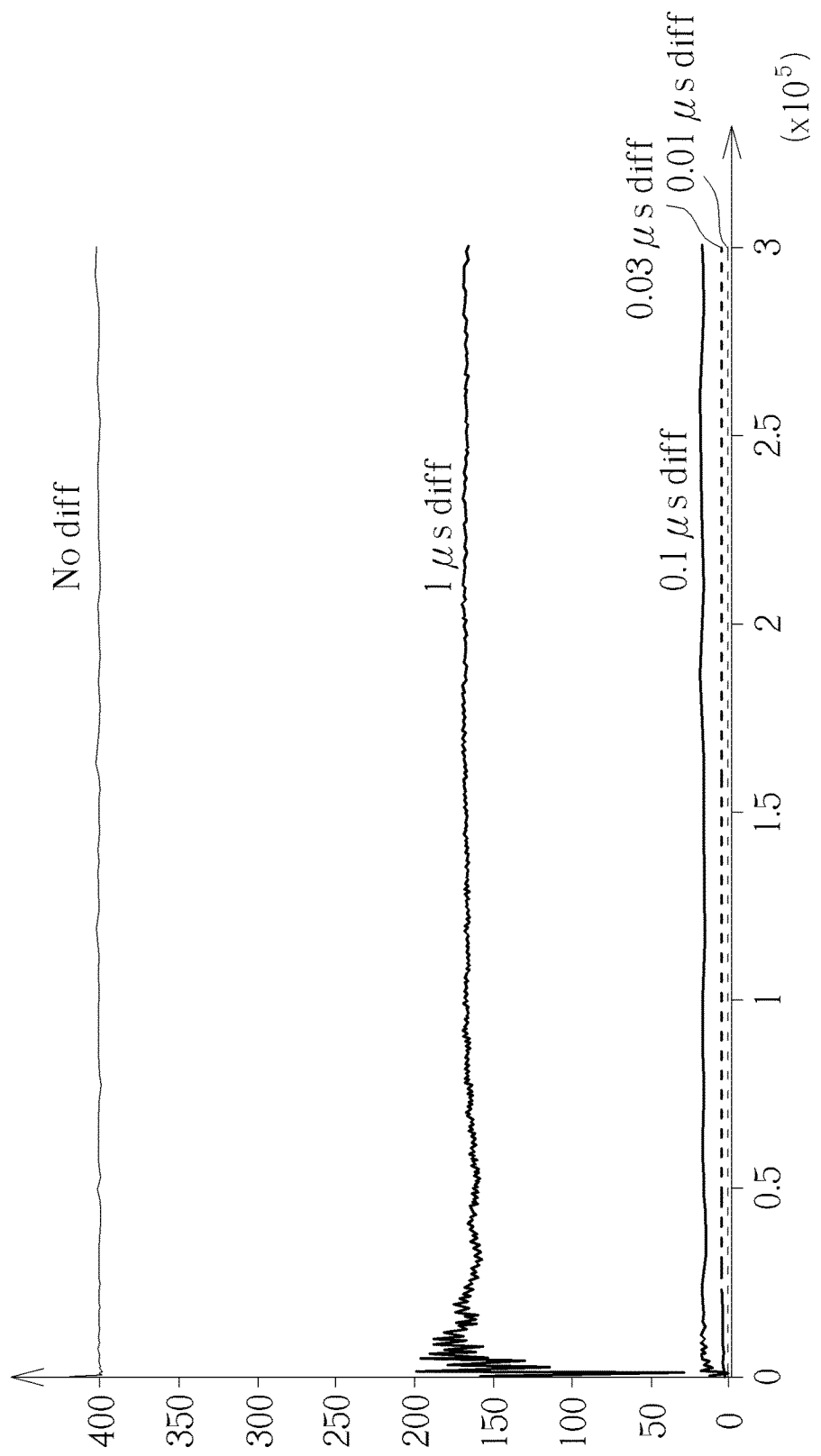
FIG. 1 is a schematic diagram of noise measurements with different timing differences of differential signals.

Please refer to FIG. 1, which is a schematic diagram of noise measurements with different timing differences of differential signals. As shown in FIG. 1, different timing differences of differential signals may result in different levels of noise interferences. For example, if two exactly the same driving signals are transmitted to two neighboring touch channels of the touch panel without any differential, the measured noise interference may be up to 400 units. If two driving signals having 1 microsecond (µs) differential are transmitted to two neighboring touch channels, the measured noise interference may decrease to be lower than 200 units. If the differential time between the two driving signals is lower than 0.1 µs, the measured noise interference may be lower than 20 units. Note that the smaller the differential time of the differential signals, the lower the measured noise interference. Thus, only a little differential time, e.g., due to a timing difference resulted from circuit mismatch of the drivers, is enough to significantly reduce the noise interference.

Figure 2:
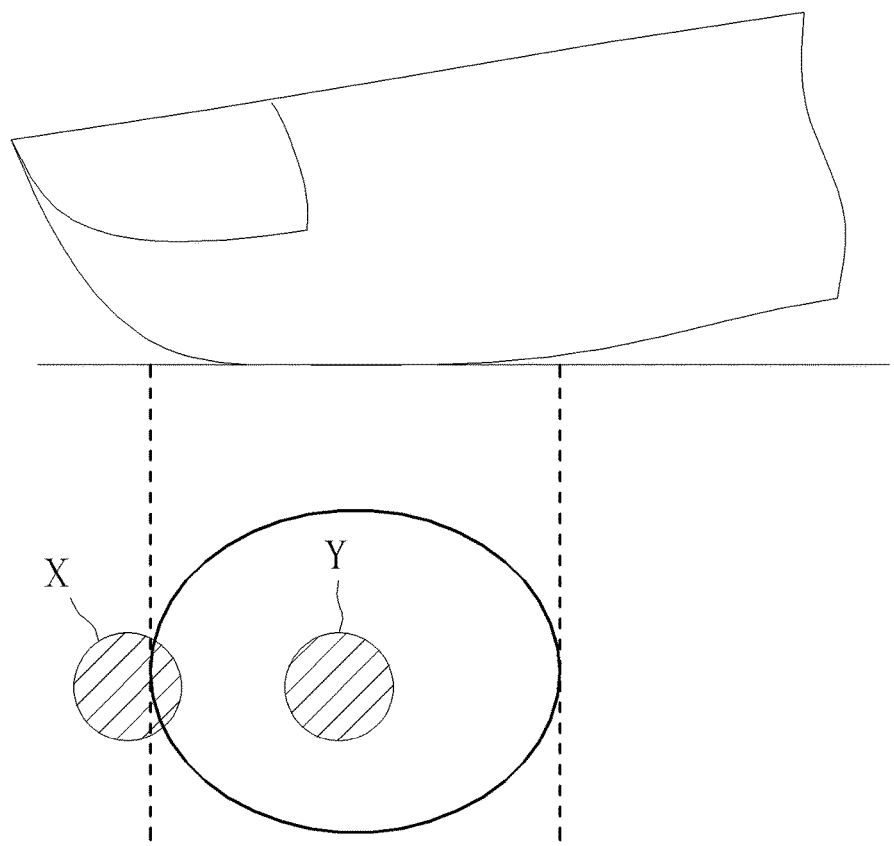
FIG. 2 is a schematic diagram of a touch event generated by a user finger.

As mentioned above, the large noises are usually accompanied by a touch event of the user finger when the device is on charge, and the noises on two neighboring points usually have high correlation. However, the magnitude of the noises coupled to the touch sensing signals may be different due to touch behaviors of the user finger. Please refer to FIG. 2, which is a schematic diagram of a touch event generated by a user finger. Since the large noises are generated by the touch event, the touch channel Y may receive a larger magnitude of noises than the touch channel X. In such a situation, the magnitudes of the touch sensing signals received from two neighboring touch channels need to be adjusted, in order to eliminate the noise interference efficiently.

Figure 3:
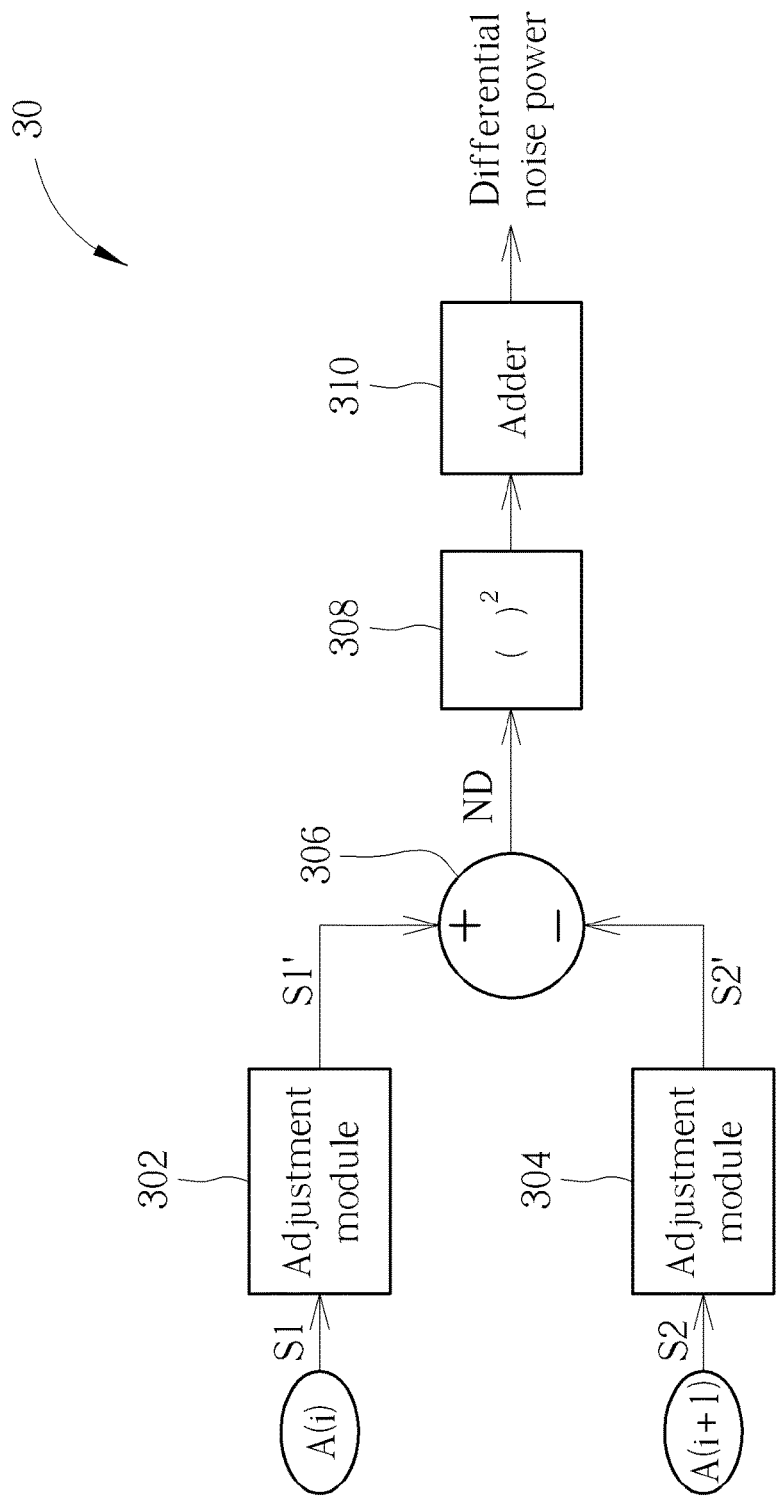
FIG. 3 is a schematic diagram of a noise estimator according to an embodiment of the present invention.

Please refer to FIG. 3, which is a schematic diagram of a noise estimator 30 according to an embodiment of the present invention. The noise estimator 30 includes adjustment modules 302 and 304, and several operators such as a subtractor 306, a squarer 308 and an adder 310. The noise estimator 30 receives a first sensing signal S1 from a touch channel A (i) of the touch panel, and receives a second sensing signal S2 from a touch channel A (i+1) neighboring to the touch channel A(i) of the touch panel. The first sensing signal S1 and the second sensing signal S2 may include noises. The adjustment module 302 may adjust the magnitude of the first sensing signal S1 to generate a first adjusted sensing signal S1', and the adjustment module 304 may adjust the magnitude of the second sensing signal S2 to generate a second adjusted sensing signal S2'. The subtractor 306 then subtracts the second adjusted sensing signal S2' from the first adjusted sensing signal S1' to generate a differential signal ND. Subsequently, the differential signal ND is squared by the squarer 308 and then summed by the adder 310 to find out the power of the differential signal ND. In general, if there is no driving signal in the touch sensing channel, the received sensing signal only includes noise components, so the differential noise power may be obtained after the square and summation operations.

In detail, several possible magnitude adjustment values may be configured in the adjustment modules 302 and 304 in advance. The noise estimator 30 may apply several different magnitude adjustment values in the adjustment modules 302 and 304 to calculate the differential noise power by several times, in order to find out a proper magnitude value reaching the minimum differential noise power between the touch channels A(i) and A (i+1). Alternatively, a touch sensing system may include several noise estimators corresponding to different magnitude adjustment values, and these noise estimators may calculate the differential noise power at the same time. In an embodiment, every noise estimator may further adjust the magnitude adjustment values within a respective range to calculate noise power. Those skilled in the art may make a selection between less circuit area and lower time consumption, to realize the noise power estimation and find out the proper magnitude adjustment value by the above methods.

Please note that in a touch panel, both the large noise and the touch signal are generated from the touch event, so the large noise and the touch signal are coupled to the touch panel and the touch channels in the same manner. If all touch channels on the touch panel receive the same driving signal, any algebra operations performed on the touch sensing signals for reducing noise interference may also reduce the touch signal components. Such operations may not achieve any improvement on the signal to noise ratio (SNR). Take the touch channels X and Y shown in FIG. 2 as an example. The large noise coupled to the touch channel Y may be K times greater than the large noise coupled to the touch channel X since the large noise is resulted from the touch of the finger. In such a situation, it is intuitive to multiply the magnitude of the sensing signal from the touch channel X by K to eliminate the noise interference after subtraction operation. However, the touch signal coupled to the touch channel Y may also be K times greater than the touch signal coupled to the touch channel X. The touch signal is also eliminated while the noise interference is eliminated. In order to solve this problem, the present invention applies differential driving signals to neighboring touch channels of the touch panel. In such a situation, the noise interference may be eliminated while the touch signal still remains. Note that the differential driving signals, e.g., the driving signals with different phases during a specific period, may be regarded as orthogonal carriers for carrying touch signals, and the orthogonal carriers may not be eliminated while the noise interference is eliminated by using the algebra operations as shown in FIG. 3.

Figure 4:
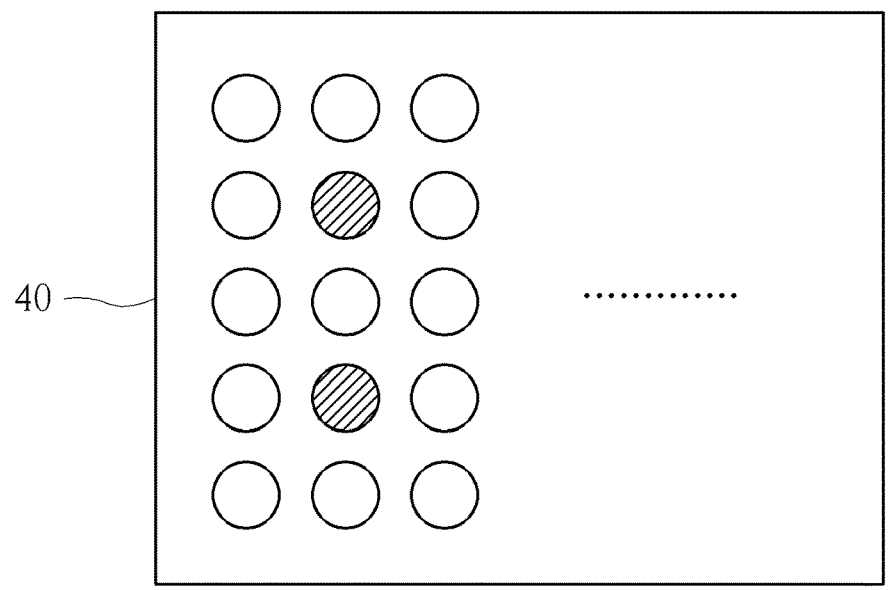
FIG. 4 is a schematic diagram of implementing the differential driving signals on a touch panel according to an embodiment of the present invention.
Figure 4:
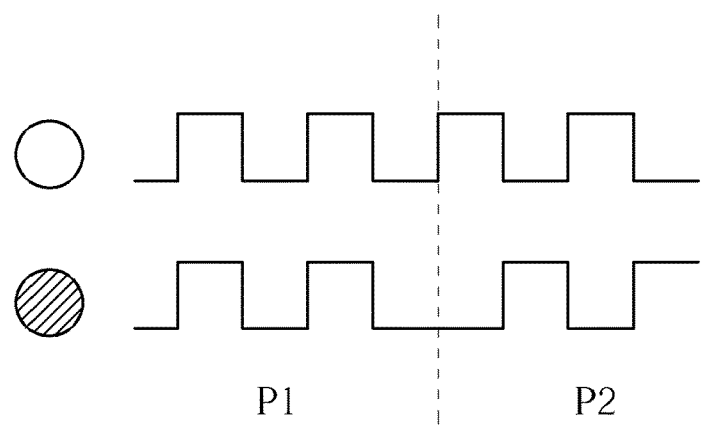

Please refer to FIG. 4, which is a schematic diagram of implementing the differential driving signals on a touch panel 40 according to an embodiment of the present invention. FIG. 4 illustrates a plurality of touch channels in the touch panel 40 of a touch sensing system where each touch channel is coupled to a signal transceiver. The touch channel may receive a driving signal from a driver and correspondingly generate a touch sensing signal received by a sensor or receiver. Two types of driving signals including a first driving signal and a second driving signal are received by the touch channels. Most of the touch channels receive the first driving signal (denoted by hollow circles) while only a few of the touch channels receive the second driving signal (denoted by oblique-lined circles) differential to the first driving signal. Note that each touch channel may include a touch sensing point on the touch panel 40 where a touch sensing electrode is disposed, as illustrated in FIG. 4. The touch channel may also include driving lines and/or sensing lines deployed for transmitting the driving signals and/or the sensing signals.

In the embodiment shown in FIG. 4, the first driving signal is a rectangular wave, and the second driving signal may be separated into two sections in two periods P1 and P2, where the first section is substantially identical to the corresponding section of the first driving signal in the first period P1, and the second section is substantially inverse to the corresponding section of the first driving signal in the second period P2. In an embodiment, the length of the first period P1 is equal to the length of the second period P2. More specifically, the two sections of the second driving signal are generated alternately and repeatedly with an equal period length. In such a situation, in a cycle of the first driving signal and the second driving signal, the first period P1 occupies a half and the second period P2 occupies the other half. In this case, the touch sensing system having the touch panel 40 and the touch channels applies the self-capacitance method to perform touch sensing.

Figure 5:
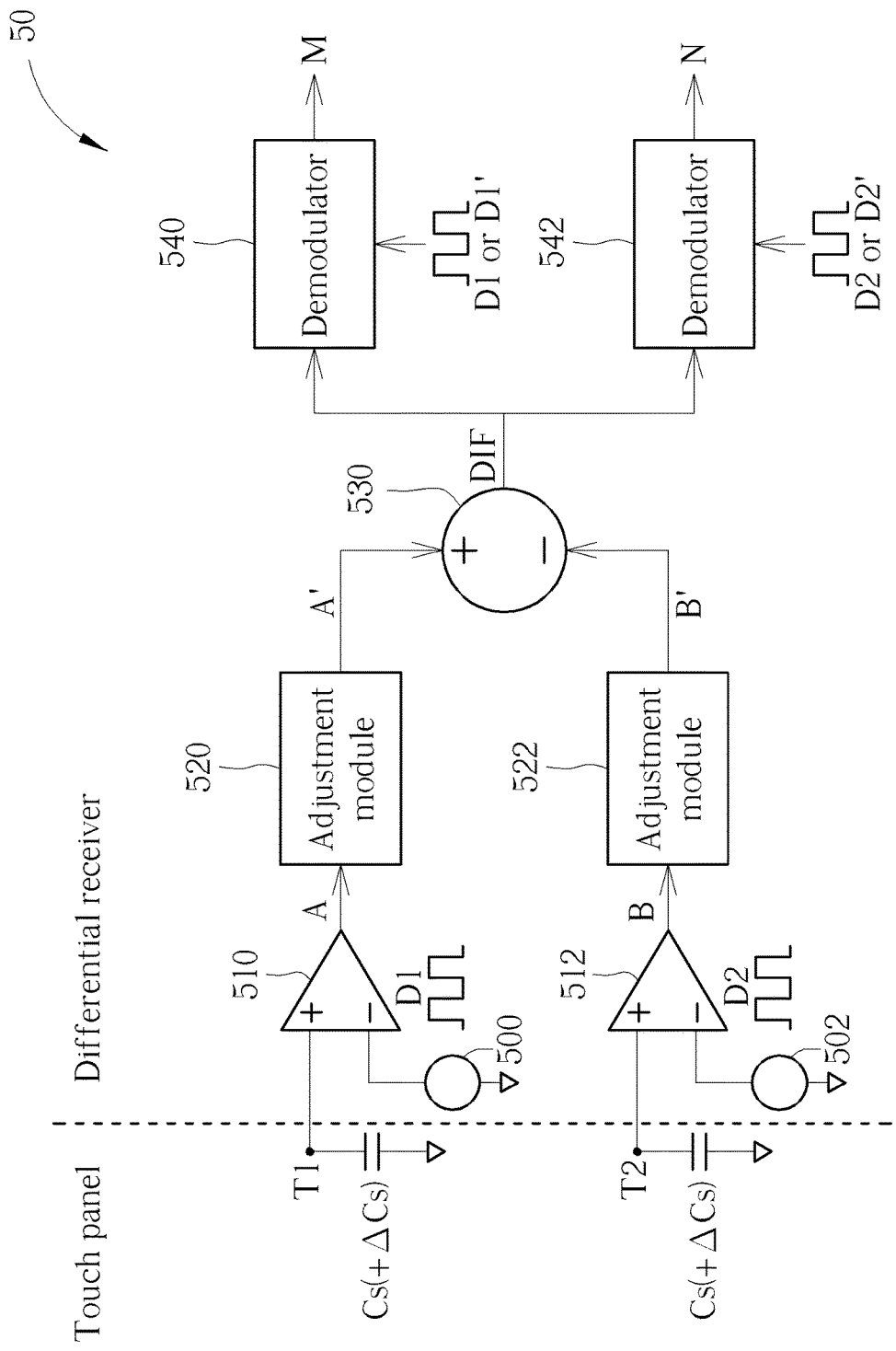
FIG. 5 is a schematic diagram of a touch sensing system according to an embodiment of the present invention.

Please refer to FIG. 5, which is a schematic diagram of a touch sensing system 50 according to an embodiment of the present invention. The touch sensing system 50 includes a touch panel and a differential receiver. The touch panel includes a first touch channel T1 and a second touch channel T2, where the second touch channel T2 is neighboring to the first touch channel T1. Those skilled in the art should realize that there are many touch channels on the touch panel, and only two of the touch channels are illustrated in FIG. 5. The differential receiver includes two channels, each of which transmits a driving signal to the corresponding touch channel T1 or T2 on the touch panel and receives a sensing signal from the touch channel T1 or T2. The differential receiver then obtains a touch sensing result by performing subtraction on the sensing signals received from these two touch channels T1 and T2.

In detail, the differential receiver includes drivers 500 and 502, analog front-end (AFE) circuits 510 and 512, adjustment modules 520 and 522, a subtractor 530, and demodulators 540 and 542. The driver 500 may transmit a first driving signal D1 to the first touch channel T1 to generate a first original sensing signal A. The AFE circuit 510, coupled to the driver 500 and the touch panel, then receives the first original sensing signal A from the first touch channel T1. The AFE circuit 510 may include an operational amplifier for coupling the first driving signal D1 to the first touch channel T1. The AFE circuit 510 then senses the capacitance Cs (and sometimes together with the capacitance variation ΔCs due to a touch event) on the touch panel, and correspondingly receives the first original sensing signal A. Similarly, the driver 502 may transmit a second driving signal D2 to the second touch channel T2 to generate a second original sensing signal B. The AFE circuit 512, coupled to the driver 502 and the touch panel, then receives the second original sensing signal B from the second touch channel T2. The AFE circuit 512 may include an operational amplifier for coupling the second driving signal D2 to the second touch channel T2. The AFE circuit 512 then senses the capacitance Cs (and sometimes together with the capacitance variation ΔCs due to a touch event) on the touch panel, and correspondingly receives the second original sensing signal B. In this embodiment, the first driving signal D1 and the second driving signal D2 are differential signals as those shown in FIG. 4; that is, the first driving signal D1 and the second driving signal D2 are identical to each other in a first period and inverse to each other in a second period.

Subsequently, the adjustment module 520, coupled to the AFE circuit 510, may receive the first original sensing signal A and adjust the magnitude of the first original sensing signal A to generate a first sensing signal A'. The adjustment module 522, coupled to the AFE circuit 512, may receive the second original sensing signal B and adjust the magnitude of the second original sensing signal B to generate a second sensing signal B'. The magnitude adjustment values of the first original sensing signal A and the second original sensing signal B may be determined by the noise estimator 30 shown in FIG. 3, in order to mitigate noise interference.

In an embodiment, the noise estimator 30 may determine that both the first original sensing signal A and the second original sensing signal B need not to be adjusted; hence, the adjustment module 520 may directly output the first original sensing signal A as the first sensing signal A' and the adjustment module 522 may directly output the second original sensing signal B as the second sensing signal B'. Alternatively, the noise estimator 30 may determine that only one of the first original sensing signal A and the second original sensing signal B needs to be adjusted, so that only one of the adjustment modules 520 and 522 performs the adjustment and the other outputs the original sensing signal directly.

Please note that the value of adjusting the magnitude of the first sensing signal A and the value of adjusting the magnitude of the second sensing signal B may be estimated by the noise estimator 30 shown in FIG. 3. In another embodiment, these parameters of the adjustment modules 520 and 522 may be estimated and determined by the differential receiver 50 itself, where the noise power may be calculated periodically in available time intervals during touch sensing periods.

Please keep referring to FIG. 5. After the magnitude adjustment is finished, the subtractor 530 may subtract the second sensing signal B' from the first sensing signal A' to generate a differential signal DIF. Since the magnitudes of the first original sensing signal A and the second original sensing signal B have been adjusted for the purpose of noise reduction, the differential signal DIF may have no or only a few noise components. The demodulators 540 and 542, which are coupled to the subtractor 530, then demodulate the differential signal DIF. In detail, the demodulator 540 may demodulate the differential signal DIF with the first driving signal D1 to generate a first output signal M corresponding to the first touch channel T1; and the demodulator 542 may demodulate the differential signal DIF with the second driving signal D2 to generate a second output signal N corresponding to the second touch channel T2.

In a general receiver, the sensing signal of a touch channel is received with a driving signal, which may be regarded as a carrier for carrying the sensing signal. After the sensing signal is received, the demodulator may multiply the received sensing signal by the driving signal to remove the carrier components and reserve the sensing signal components, and then perform integral operation to obtain the touch sensing result. However, in the differential receiver of the present invention, the differential signal DIF after subtraction includes components of the first original sensing signal A and the second original sensing signal B. Therefore, the first output signal M after demodulation may still have components of the first original sensing signal A and the second original sensing signal B, and the second output signal N after demodulation may also have components of the first original sensing signal A and the second original sensing signal B. In order to recover the first original sensing signal A and the second original sensing signal B to solve the touch sensing result, the differential receiver may perform an inverse matrix operation on the first output signal M and the second output signal N. This is because the above magnitude adjusting operations of the adjustment modules 520 and 522, subtracting operations of the subtractor 530, and demodulating operations of the demodulators 540 and 542 are all linear operations, and the combination of them may be regarded as a matrix operation. Therefore, the first original sensing signal A and the second original sensing signal B may be recovered by performing the inverse matrix operation, which is inverse to this matrix operation, on the first output signal M and the second output signal N, as shown in the following formulas:

$$[A\ B] \times [matrix] = [M\ N];$$

$$[A\ B] = [M\ N] \times inv[matrix].$$

Please note that the inverse matrix operation may require more computation resources and also result in higher power consumption. Preferably, the inverse matrix operation may not be performed at all time; instead, the inverse matrix operation may be performed only when the values of the first output signal M and/or the second output signal N have an evident variation, which may occur when the first original sensing signal A and/or the second original sensing signal B have an evident variation. It should be noted that the touch events only occur in partial time during a period from time viewpoint, and that the touch events only occur in partial places within an entire touch panel from space viewpoint. Therefore, for most time and in most places, the touch sensing signals may not change, where the inverse matrix operation that requires large amounts of power consumption and computation resource to obtain a precise touch sensing result is not necessary.

It should be noted that the parasitic capacitance between different touch channels may severely interfere with the touch sensing operations since the value of the parasitic capacitance is far greater than the capacitance variation generated by a touch event. In a general driving method to deal with this problem, several lines of touch channels may receive the same driving signal at the same time, so that there is no voltage difference between these touch channels in touch sensing operations. In such a situation, the parasitic capacitance may not be charged or discharged without any voltage difference, and thereby may not interfere with the touch sensing operations. In addition, a large capacitance may be generated on the touch panel if water drops onto the touch panel. This water capacitance may be regarded as another parasitic capacitance and may also be solved by the driving method where all touch channels receive the same driving signal.

However, the differential driving method of the present invention applies differential driving signals in neighboring touch channels, and needs to face the problems of parasitic capacitance and water capacitance. The parasitic capacitance originally existing in between the touch channels and the water capacitance from water drops on the touch panel will be generally called parasitic capacitance hereinafter.

Figure 6:
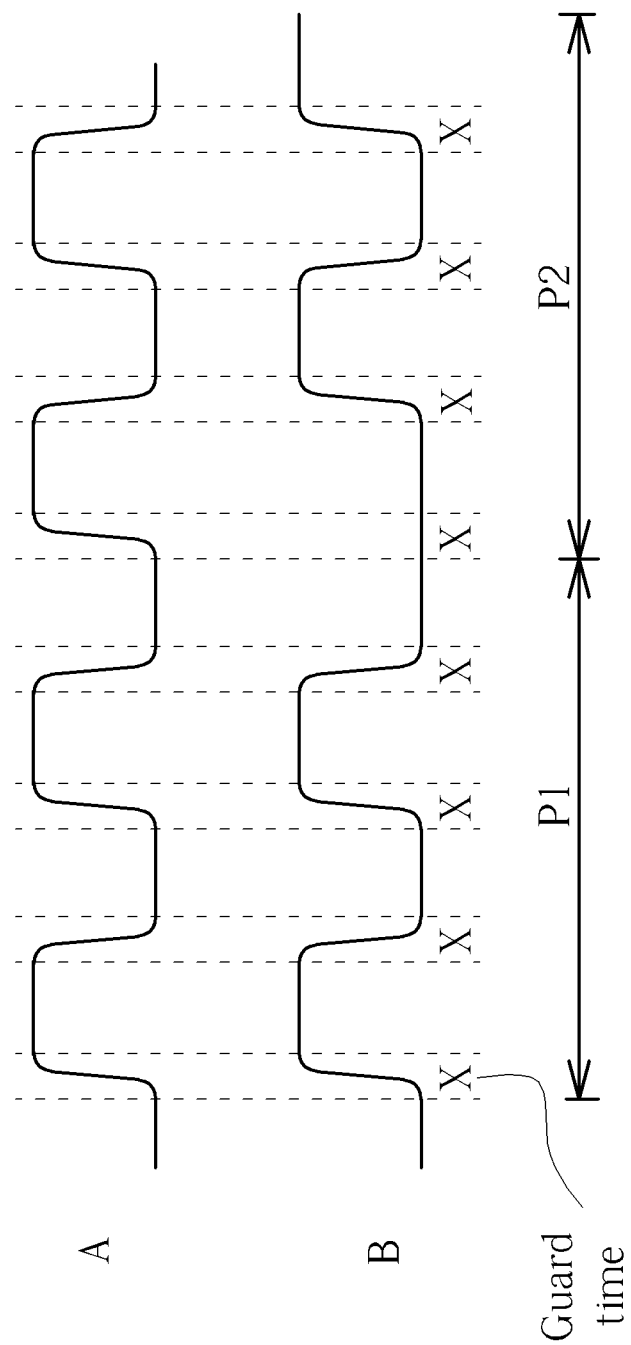
FIG. 6 is a waveform diagram of the first original sensing signal and the second original sensing signal as shown in FIG. 5.

As mentioned above, the parasitic capacitance influences the touch sensing operation only when the voltage difference between two touch channels changes to charge or discharge the parasitic capacitance. An exemplary embodiment of touch sensing signals is shown in FIG. 6, which illustrates waveforms of the first original sensing signal A and the second original sensing signal B as shown in FIG. 5, and the waveforms may also be considered as the first sensing signal A' and the second sensing signal B' since the first original sensing signal A and the first sensing signal A' have difference only in their magnitudes and the second original sensing signal B and the second sensing signal B have difference only in their magnitudes. The first sensing signal A' and the second sensing signal B' are generated from the first original sensing signal A and the second original sensing signal B, respectively. The first original sensing signal A and the second original sensing signal B are further triggered by the rectangular-wave driving signals D1 and D2, respectively, where the driving signals D1 and D2 have waveforms as those shown in FIG. 4. These sensing signals appear to rise and fall exponentially due to RC effects from the touch panel. In FIG. 6, the interference of parasitic capacitance appears at rising time and falling time of the first sensing signal A' and the second sensing signal B', where the voltage difference between the first touch channel T1 and the second touch channel T2 varies at these time. In an embodiment, in order to eliminate the interference of parasitic capacitance, the differential receiver may be disabled and may stop receiving the first original sensing signal A and the second original sensing signal B during the rising time and falling time of the first original sensing signal A and the second original sensing signal B, as shown in FIG. 6. The disabled time of the differential receiver is called a guard time, in which at least one of the first sensing signal A' (and the first original sensing signal A) and the second sensing signal B' (and the second original sensing signal B) has a status transition. Note that the parasitic capacitance may not interfere with the touch sensing operation during the high pulses or low pulses of the sensing signals where the sensing signals do not change.

Taking the differential receiver 50 as an example, the AFE circuit 510 may stop receiving the first original sensing signal A and the AFE circuit 512 may stop receiving the second original sensing signal B during the signal transient periods of the first original sensing signal A and the second original sensing signal B, i.e., during the guard time. Note that the parasitic capacitance is far greater than the capacitance variation generated by a touch event, and may generate tremendous variations on the sensing signals. If the variations exceed a threshold, the variations may burn out the circuit elements of the differential receiver. In such a situation, the AFE circuits may preferably be disabled, to prevent the circuit elements from being burnt or ruined.

Preferably, the border between the first period P1 and the second period P2 may also be within the guard time in which reception of the sensing signals is interrupted. In some examples, the second driving signal D2 has a phase change in the border between the first period P1 and the second period P2, and thus there may be a status transition appearing on the second driving signal D2, the second original sensing signal B and the second sensing signal B' in this border. Interruption of reception in the border prevents the parasitic capacitance from being interfering with the touch sensing operations and/or burning out the circuit elements.

In another embodiment, the sensing signals in these periods may be received and dealt with in the demodulator, to cancel the interference of parasitic capacitance. As mentioned above, the sensing signals appear to rise and fall exponentially according to the RC effects from the touch panel. The RC equivalent circuit on the touch panel may generate similar effects on the rising behavior and falling behavior; that is, the exponential rising and exponential falling of the sensing signal may be symmetrical to each other. With the symmetrical characteristics, the influences of parasitic capacitance due to the rising signal and falling signal may be cancelled after demodulation. In an embodiment, the demodulator 540 may perform demodulation with a first modified driving signal D1' instead of the first driving signal D1, and the demodulator 542 may perform demodulation with a second modified driving signal D2' instead of the second driving signal D2.

Figure 7:
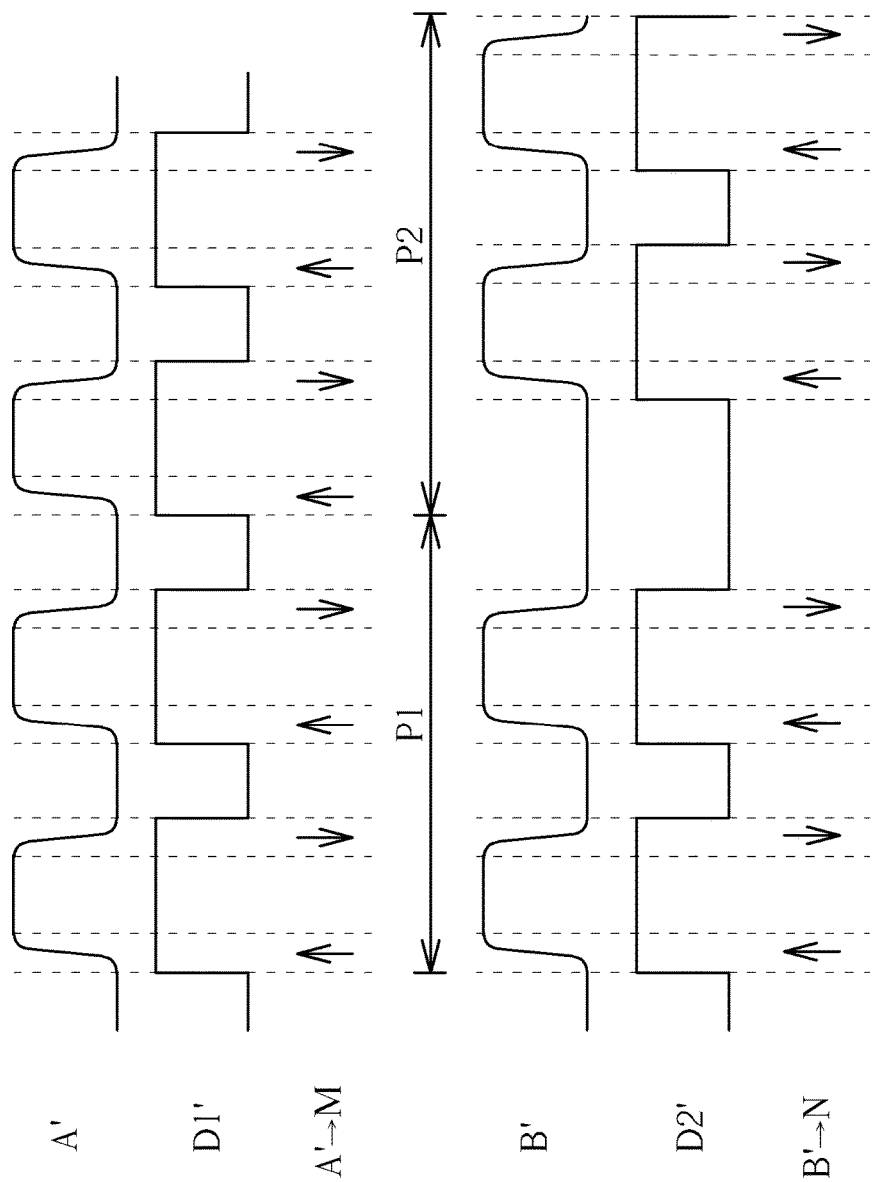
FIG. 7 is a waveform diagram of touch signals according to an embodiment of the present invention.

Please refer to FIG. 7, which is a waveform diagram of touch signals according to an embodiment of the present invention. FIG. 7 illustrates the first sensing signal A', the second sensing signal B', the first modified driving signal D1' and the second modified driving signal D2' as those shown in FIG. 5. Note that the first driving signal D1 is identical to the second driving signal D2 in the first period P1 and the first driving signal D1 is inverse to the second driving signal D2 in the second period P2. The first modified driving signal D1' is modified from the first driving signal D1 by extending the lengths of high pulses of the first driving signal D1, and the second modified driving signal D2' is modified from the second driving signal D2 by extending the lengths of high pulses of the second driving signal D2. Also, the first sensing signal A' may be identical to the second sensing signal B' in the first period P1 and the first sensing signal A' may be inverse to the second sensing signal B' in the second period P2.

Please refer to FIG. 7 together with the differential receiver shown in FIG. 5. As shown in FIG. 5, the demodulator 540 may perform demodulation on the differential signal DIF with the first modified driving signal D1', and the demodulator 542 may perform demodulation on the differential signal DIF with the second modified driving signal D2'. In detail, the demodulation operation includes multiplication and integral operations. The demodulator 540 may multiply the differential signal DIF by the first modified driving signal D1' to obtain multiplication results, and then perform integral operation on the multiplication results to obtain the first output signal M. The demodulator 542 may multiply the differential signal DIF by the second modified driving signal D2' to obtain multiplication results, and then perform integral operation on the multiplication results to obtain the second output signal N.

As mentioned above, the exponential rising and exponential falling of the sensing signal are symmetrical to each other, and the symmetrical characteristics allow the differential receiver to cancel the interferences of parasitic capacitance due to the rising signal and falling signal. As shown in FIG. 7, the high pulses of the first modified driving signal D1' are extended to cover the exponential falling edge of the first sensing signal A'; hence, both the exponential rising edge and the exponential falling edge of the first sensing signal A' are covered in the high pulse of the first modified driving signal D1'. After the differential signal DIF is multiplied by the first modified driving signal D1' and undergoes the integral operation in the demodulator 540, the exponential rising components and exponential falling components of the first sensing signal A' in the differential signal DIF may be cancelled with the extended pulse length of the first modified driving signal D1' due to their symmetrical characteristic. In detail, with the operation of the demodulator 540, each exponential rising edge of the first sensing signal A' is multiplied by the high level of the first modified driving signal D1' and thereby generates a rising component in the first output signal M (denoted by a rising arrow), and each exponential falling edge of the first sensing signal A' is multiplied by the high level of the first modified driving signal D1' and thereby generates a falling component in the first output signal M (denoted by a falling arrow). The number of rising components and the number of falling components are equal and the effects of the exponential rising/falling may be cancelled out after the integral operation.

Similarly, the high pulses of the second modified driving signal D2' are extended to cover the exponential falling edge of the second sensing signal B'; hence, both the exponential rising edge and the exponential falling edge of the second sensing signal B' are covered in the high pulse of the second modified driving signal D2'. After the differential signal DIF is multiplied by the second modified driving signal D2' and undergoes the integral operation in the demodulator 542, the exponential rising components and exponential falling components of the second sensing signal B' in the differential signal DIF may be cancelled with the extended pulse length of the second modified driving signal D2' due to their symmetrical characteristic. In detail, with the operation of the demodulator 542, each exponential rising edge of the second sensing signal B' is multiplied by the high level of the second modified driving signal D2' and thereby generates a rising component in the second output signal N (denoted by a rising arrow), and each exponential falling edge of the second sensing signal B' is multiplied by the high level of the second modified driving signal D2' and thereby generates a falling component in the second output signal N (denoted by a falling arrow). The number of rising components and the number of falling components are equal and the effects of the exponential rising/falling may be cancelled out after the integral operation.

As a result, the interference of parasitic capacitance on the first output signal M due to the exponential rising and falling of the first original sensing signal A may be eliminated, where the first original sensing signal A has similar rising and falling behaviors as the first sensing signal A' and generates similar effects in the differential signal DIF. The interference of parasitic capacitance on the second output signal N due to the exponential rising and falling of the second original sensing signal B may also be eliminated, where the second original sensing signal B has similar rising and falling behaviors as the second sensing signal B' and generates similar effects in the differential signal DIF.

In a similar manner, the interference of parasitic capacitance on the first output signal M due to the exponential rising and falling of the second original sensing signal B and the interference of parasitic capacitance on the second output signal N due to the exponential rising and falling of the first original sensing signal A may also be eliminated. More specifically, the differential signal DIF has components of the first original sensing signal A and the second original sensing signal B regardless of whether they are adjusted. The demodulator 540, which demodulates the differential signal DIF with the first modified driving signal D1' to remove the exponential rising and falling components of the first original sensing signal A, should also remove the exponential rising and falling components of the second original sensing signal B. The demodulator 542, which demodulates the differential signal DIF with the second modified driving signal D2' to remove the exponential rising and falling components of the second original sensing signal B, should also remove the exponential rising and falling components of the first original sensing signal A.

Figure 8:
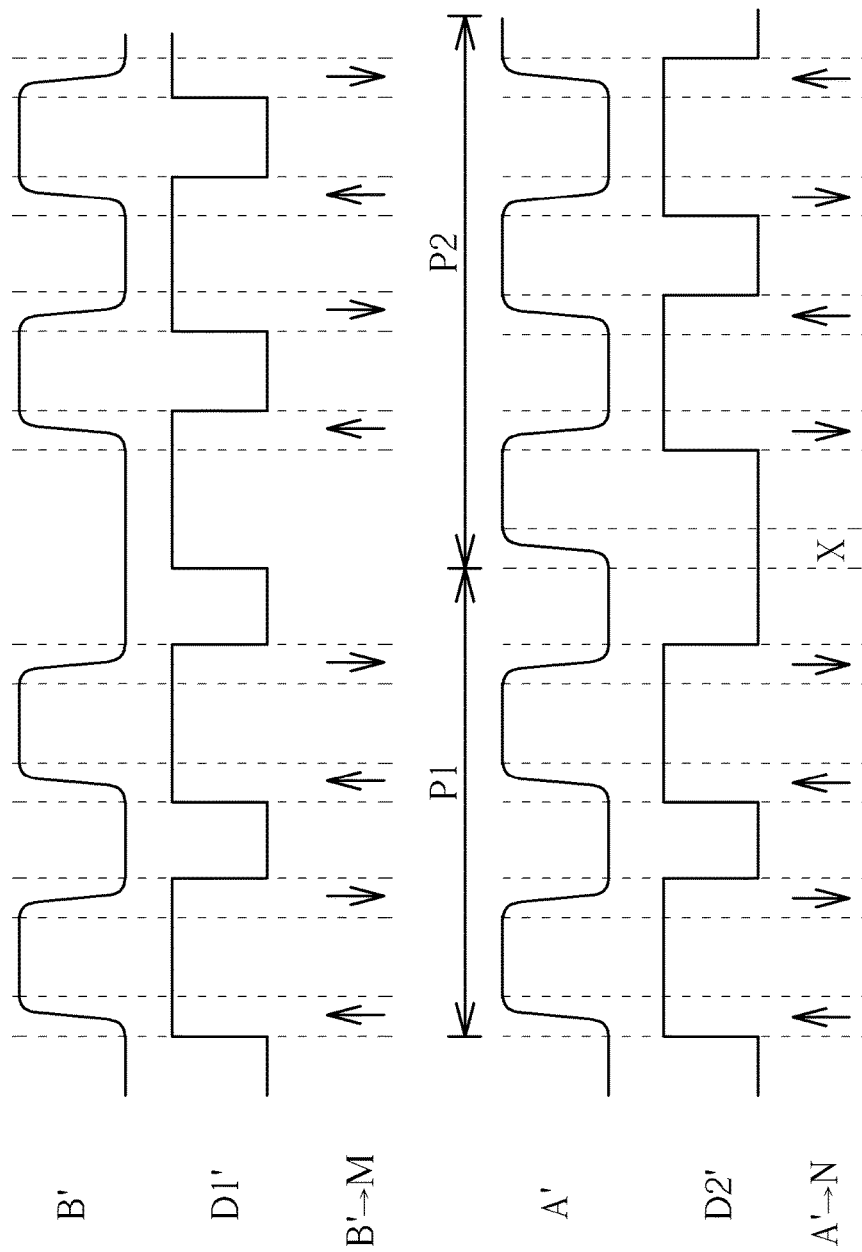
FIG. 8 is a waveform diagram of touch signals according to an embodiment of the present invention.

FIG. 8 illustrates waveforms similar to those shown in FIG. 7, where the first modified driving signal D1' is modified from the first driving signal D1 by extending the lengths of high pulses of the first driving signal D1, and the second modified driving signal D2' is modified from the second driving signal D2 by extending the lengths of high pulses of the second driving signal D2. As shown in FIG. 8, the interference of parasitic capacitance on the first output signal M due to the exponential rising and falling of the second original sensing signal B may be eliminated, and the interference of parasitic capacitance on the second output signal N due to the exponential rising and falling of the first original sensing signal A may also be eliminated.

In detail, in the first period P1, each exponential rising edge of the second sensing signal B' is multiplied by the high level of the first modified driving signal D1' and thereby generates a rising component in the first output signal M, and each exponential falling edge of the second sensing signal B' is multiplied by the high level of the first modified driving signal D1' and thereby generates a falling component in the first output signal M. In the second period P2, each exponential rising edge of the second sensing signal B' is multiplied by the high level of the first modified driving signal D1' and thereby generates a rising component in the first output signal M, and each exponential falling edge of the second sensing signal B' is multiplied by the high level of the first modified driving signal D1' and thereby generates a falling component in the first output signal M. After the differential signal DIF is multiplied by the first modified driving signal D1' and undergoes the integral operation in the demodulator 540, the exponential rising components and exponential falling components of the second sensing signal B' in the differential signal DIF may be cancelled with the extended pulse length of the first modified driving signal D1' due to their symmetrical characteristic.

Similarly, the interference of parasitic capacitance due to the signal components of the first sensing signal A' on the second output signal N may also be eliminated. In the first period P1, each exponential rising edge of the first sensing signal A' is multiplied by the high level of the second modified driving signal D2' and thereby generates a rising component in the second output signal N, and each exponential falling edge of the first sensing signal A' is multiplied by the high level of the second modified driving signal D2' and thereby generates a falling component in the second output signal N. In the second period P2, each exponential rising edge of the first sensing signal A' is multiplied by the high level of the second modified driving signal D2' and thereby generates a rising component in the second output signal N, and each exponential falling edge of the first sensing signal A' is multiplied by the high level of the second modified driving signal D2' and thereby generates a falling component in the second output signal N. After the differential signal DIF is multiplied by the second modified driving signal D2' and undergoes the integral operation in the demodulator 542, the exponential rising components and exponential falling components of the first sensing signal A' in the differential signal DIF may be cancelled with the extended pulse length of the first modified driving signal D1' due to their symmetrical characteristic.

As shown in FIG. 8, the border between the first period P1 and the second period P2 is configured to be within the guard time, where reception of the sensing signals is interrupted.

According to embodiments of the present invention, elimination of the interference of parasitic capacitance may be achieved by disabling the differential receiver during the transient time of the sensing signals, or achieved by demodulating the differential signal with modified driving signals generated by extending the original driving signals. These two methods may be combined to achieve a preferable noise cancellation performance. For example, the demodulation method may be performed in usual, in order to prevent too long disabled time generated by the disabling method. When a larger variation on the sensing signal is detected, the disabling method is applied in order to prevent the circuit elements from being burnt or ruined.

Please note that the present invention aims at providing a signal processing method for noise cancellation in a touch sensing system and the touch sensing system using the signal processing method to obtain touch sensing results, where a differential receiver capable of adjusting magnitudes of sensing signals for noise cancellation is included in the touch sensing system. Those skilled in the art can make modifications and alternations accordingly. For example, in the above embodiments, the second driving signal D2 is separated into two sections; while in another embodiment, the driving signal being separated to two sections may be the first driving signal D1. In addition, the differential driving method of the present invention may be applied to any number of touch channels on the touch panel, where every touch channel may receive the first driving signal D1 or the second driving signal D2 differential to the first driving signal D1 according to system requirements; hence, there may be any number of touch channels receiving the differential second driving signal D2 on the touch panel. In the above embodiments, the driving signals are rectangular wave signals; while in other embodiments, the driving signals may be realized by other types of signals such as sine wave signals.

Figure 9:
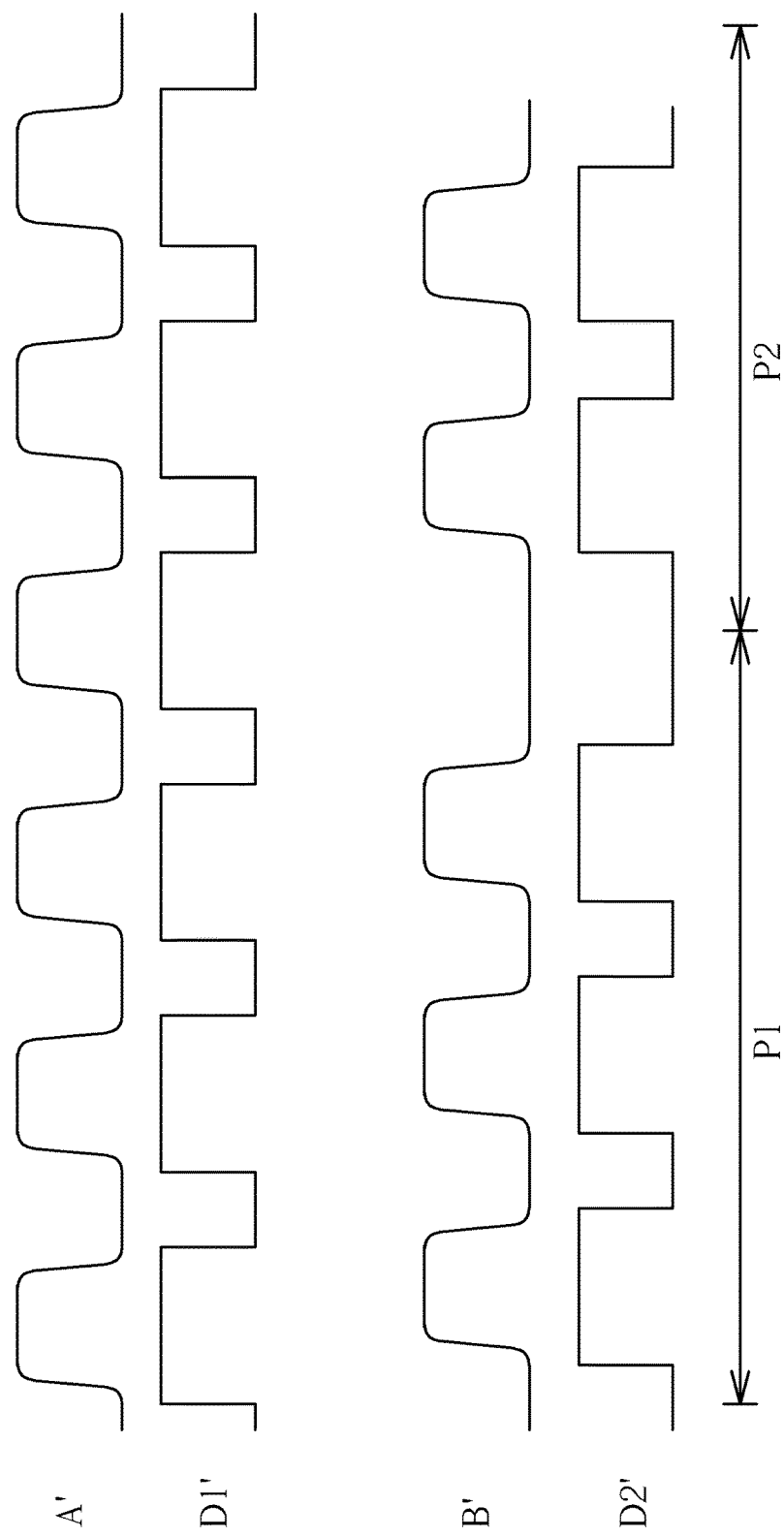
FIG. 9 is a waveform diagram of touch signals according to an embodiment of the present invention.

In the above embodiments, the differential driving signals are realized by controlling the phases of the two driving signals, wherein in one period the two driving signals have an identical phase and in another period the two driving signals have inverse phases. In another embodiment, the differential driving signals may be realized by other method. In an exemplary embodiment, the second driving signal D2 may be delayed from the first driving signal D1 to realize the differentiation. Further, the second driving signal D2 may be separated into two sections in two periods, where the first section is delayed from the first driving signal D1 and the second section in the second period P2 is inverse to the first section of the second driving signal D2 in the first period P1. This implementation may generate the first sensing signal A' and the second sensing signal B' as shown in FIG. 9. With the corresponding first modified driving signal D1' and second modified driving signal D2' applied in the demodulators 540 and 542, the interference of parasitic capacitance on the first output signal M and the second output signal N from both channels may be easily eliminated.

In the embodiment with a delay, the exponential components of a sensing signal generated in the first period may not be easily cancelled but may be accumulated in one direction in the output signal of the counterpart channel, and these accumulated exponential components may be offset by the exponential components of the sensing signal generated in the second period due to the signal inversion. For example, the first sensing signal A' may generate several rising components in the first period P1 after being multiplied by the second modified driving signal D2', and the rising components are accumulated in the second output signal N. Such rising components may be offset by the falling components generated by the first sensing signal A' multiplied by the second modified driving signal D2' in the second period P2 after demodulation. Therefore, with well-configured lengths of the first period P1 and the second period P2, the interference of parasitic capacitance on the output signals due to the exponential rising and falling edges of the sensing signals may be eliminated. Preferably, the length of the first period P1 is configured to be equal to the length of the second period P2, in order to effectively eliminate the interference of the parasitic capacitance.

Figure 10A:
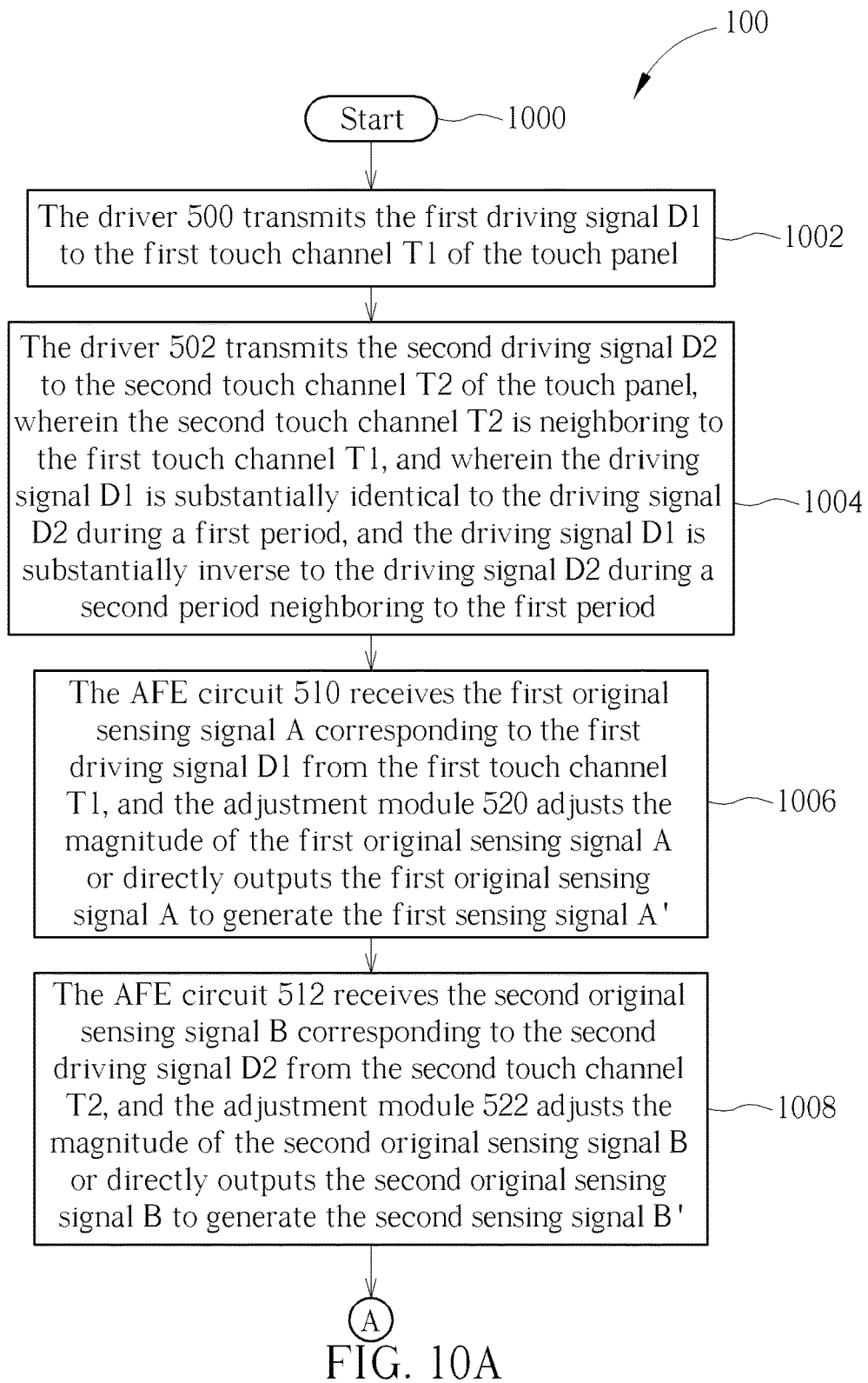
FIGS. 10A and 10B are schematic diagrams of a signal processing process according to an embodiment of the present invention.
Figure 10B:
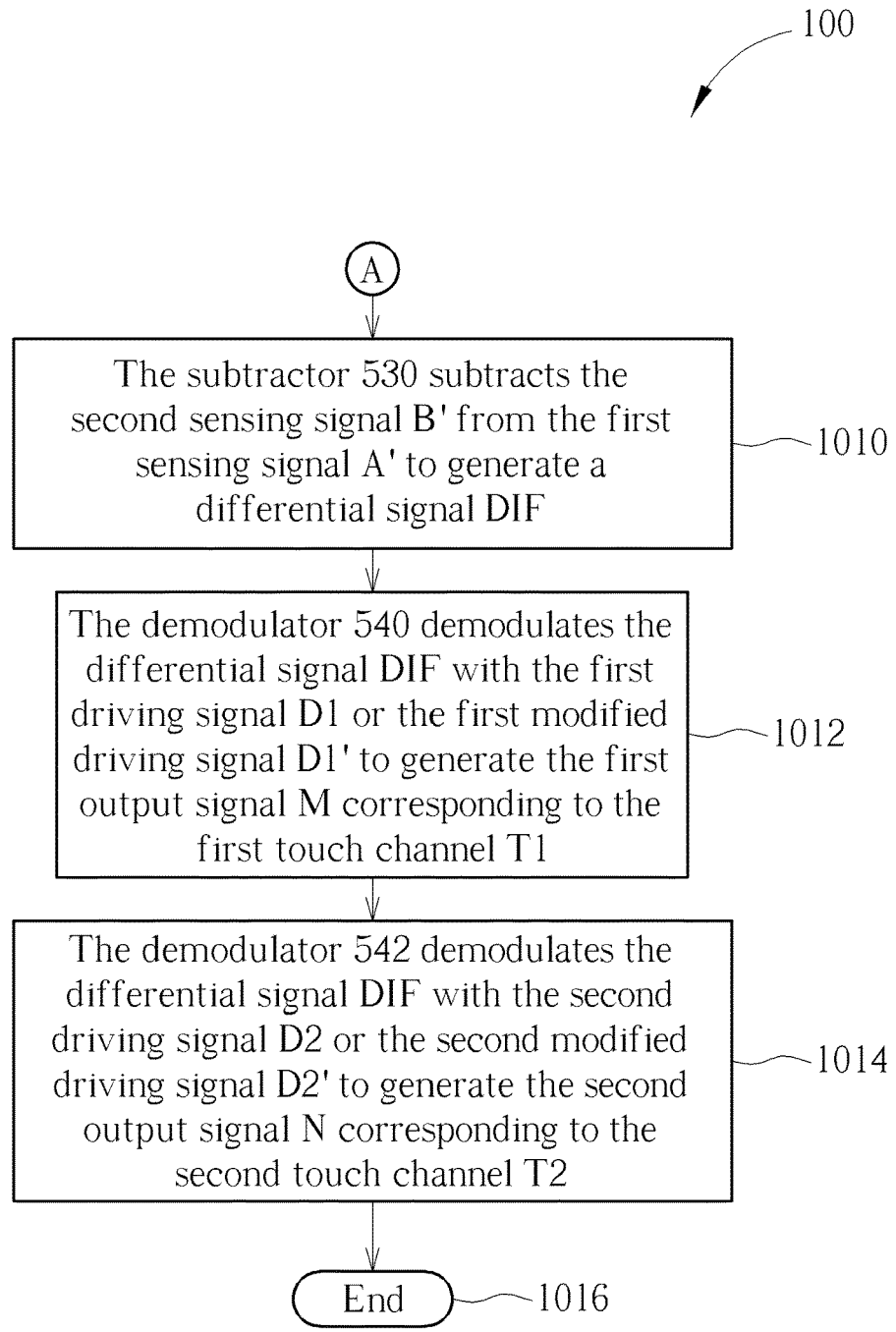

The above operations of the signal processing method used in the differential receiver of the touch sensing system may be summarized into a signal processing process 100, as shown in FIGS. 10A and 10B. The signal processing process 100, which may be used in the differential receiver of the touch sensing system 50 shown in FIG. 5, includes the following steps:

Step 1000: Start.

Step 1002: The driver 500 transmits the first driving signal D1 to the first touch channel T1 of the touch panel.

Step 1004: The driver 502 transmits the second driving signal D2 to the second touch channel T2 of the touch panel, wherein the second touch channel T2 is neighboring to the first touch channel T1, and wherein the driving signal D1 is substantially identical to the driving signal D2 during a first period, and the driving signal D1 is substantially inverse to the driving signal D2 during a second period neighboring to the first period.

Step 1006: The AFE circuit 510 receives the first original sensing signal A corresponding to the first driving signal D1 from the first touch channel T1, and the adjustment module 520 adjusts the magnitude of the first original sensing signal A or directly outputs the first original sensing signal A to generate the first sensing signal A'.

Step 1008: The AFE circuit 512 receives the second original sensing signal B corresponding to the second driving signal D2 from the second touch channel T2, and the adjustment module 522 adjusts the magnitude of the second original sensing signal B or directly outputs the second original sensing signal B to generate the second sensing signal B'.

Step 1010: The subtractor 530 subtracts the second sensing signal B' from the first sensing signal A' to generate a differential signal DIF.

Step 1012: The demodulator 540 demodulates the differential signal DIF with the first driving signal D1 or the first modified driving signal D1' to generate the first output signal M corresponding to the first touch channel T1.

Step 1014: The demodulator 542 demodulates the differential signal DIF with the second driving signal D2 or the second modified driving signal D2' to generate the second output signal N corresponding to the second touch channel T2.

Step 1016: End.

To sum up, the embodiments provide a signal processing method for noise cancellation applicable to a touch sensing system and also provide a touch sensing system using the signal processing method to obtain touch sensing results. A differential receiver having two channels can be included in the touch sensing system, and the two channels can apply differential driving signals and correspondingly receive differential sensing signals. In an embodiment, the second driving signal may be separated into two sections, where one section is substantially identical to the first driving signal and the other section is substantially inverse to the first driving signal. In the differential receiver, the magnitudes of the received sensing signals can be adjusted, in order to minimize the noise power of the differential signal. The differential signal can be obtained and then demodulated with the first driving signal (or the first modified driving signal) and the second driving signal (or the second modified driving signal) respectively to obtain the touch sensing results. The interference of parasitic capacitance on the touch panel can be further eliminated by disabling the differential receiver during a guard time where any of the sensing signals has a status change, and also by demodulating the differential signal with the modified driving signals generated by extending the original driving signals. According to embodiments of the present invention, the interference of large noise due to charging currents under touch events and the interference of parasitic capacitance on the touch panel may be mitigated or eliminated, so as to achieve a preferable touch sensing performance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing method for a touch panel, comprising:
   transmitting a first driving signal to a first touch channel of the touch panel; and
   transmitting a second driving signal to a second touch channel of the touch panel, wherein the second touch channel is neighboring to the first touch channel;
   wherein the first driving signal is substantially identical to the second driving signal during a first period, and the first driving signal is substantially inverse to the second driving signal during a second period neighboring to the first period;

wherein a border between the first period and the second period is within a guard time, in which reception of sensing signals corresponding to the first driving signal and the second driving signal is interrupted.

2. The signal processing method of claim 1, wherein the length of the first period is equal to the length of the second period.

3. The signal processing method of claim 1, wherein the first period occupies a half of a cycle of the first driving signal and the second driving signal, and the second period occupies the other half of the cycle of the first driving signal and the second driving signal.

4. The signal processing method of claim 1, further comprising:
   obtaining a first sensing signal corresponding to the first driving signal;
   obtaining a second sensing signal corresponding to the second driving signal;
   subtracting the second sensing signal from the first sensing signal to generate a differential signal;
   demodulating the differential signal with the first driving signal to generate a first output signal corresponding to the first touch channel; and
   demodulating the differential signal with the second driving signal to generate a second output signal corresponding to the second touch channel.

5. The signal processing method of claim 4, wherein the step of obtaining the first sensing signal corresponding to the first driving signal comprises receiving a first original sensing signal, and the step of obtaining the second sensing signal corresponding to the second driving signal comprises receiving a second original sensing signal, wherein either or both of a magnitude of the first original sensing signal and a magnitude of the second original sensing signal are further adjusted to generate the first sensing signal and the second sensing signal.

6. The signal processing method of claim 4, further comprising:
   obtaining first and second touch sensing result signals by performing a matrix operation on the first output signal and the second output signal.

7. The signal processing method of claim 4, wherein the step of demodulating the differential signal with the first driving signal to generate a first output signal corresponding to the first touch channel comprises:
   multiplying the differential signal by a first modified driving signal to generate a plurality of multiplication results; and
   performing an integral operation on the plurality of multiplication results to generate the first output signal; and
   wherein the step of demodulating the differential signal with the second driving signal to generate a second output signal corresponding to the second touch channel comprises:
   multiplying the differential signal by a second modified driving signal to generate a plurality of multiplication results; and
   performing an integral operation on the plurality of multiplication results to generate the second output signal.

8. The signal processing method of claim 7, wherein the first modified driving signal is modified from the first driving signal by extending a pulse length of the first driving signal, and wherein the second modified driving signal is modified from the second driving signal by extending a pulse length of the second driving signal.

9. The signal processing method of claim 4, further comprising:

stopping receiving the first sensing signal and the second sensing signal during the guard time, in which at least one of the first sensing signal and the second sensing signal has a status transition.

10. A touch sensing system, comprising:
    a touch panel, comprising a first touch channel and a second touch channel neighboring to the first touch channel;
    a first driver, coupled to the touch panel, for transmitting a first driving signal to the first touch channel to generate a first sensing signal;
    a second driver, coupled to the touch panel, for transmitting a second driving signal to the second touch channel to generate a second sensing signal; and
    a differential receiver, coupled to the touch panel, for receiving the first sensing signal from the first touch channel and receiving the second sensing signal from the second touch channel, to obtain a touch sensing result by subtracting the second sensing signal from the first sensing signal;
    wherein the first driving signal is substantially identical to the second driving signal during a first period, and the first driving signal is substantially inverse to the second driving signal during a second period neighboring to the first period;
    wherein a border between the first period and the second period is within a guard time, in which reception of sensing signals corresponding to the first driving signal and the second driving signal is interrupted.

11. A signal processing method for a touch panel, comprising:
    transmitting a first driving signal to a first touch channel of the touch panel; and
    transmitting a second driving signal to a second touch channel of the touch panel, wherein the second touch channel is neighboring to the first touch channel;
    wherein the first driving signal and the second driving signal have different phases during a first period;
    wherein a border between the first period and a second period is within a guard time, in which reception of sensing signals corresponding to the first driving signal and the second driving signal is interrupted.

12. The signal processing method of claim 11, wherein the first driving signal is substantially inverse to the second driving signal during the first period, and the first driving signal is substantially identical to the second driving signal during the second period neighboring to the first period.

13. The signal processing method of claim 11, wherein the second driving signal is delayed from the first driving signal.

14. A signal processing method for a touch panel, comprising:
    transmitting a first driving signal to a first touch channel of the touch panel;
    transmitting a second driving signal to a second touch channel of the touch panel, wherein the second touch channel is neighboring to the first touch channel;
    obtaining a first sensing signal corresponding to the first driving signal;
    obtaining a second sensing signal corresponding to the second driving signal;
    generating a differential signal according to a difference between the second sensing signal and the first sensing signal;
    demodulating the differential signal with the first driving signal to generate a first output signal corresponding to the first touch channel;

demodulating the differential signal with the second driving signal to generate a second output signal corresponding to the second touch channel; and stopping receiving the first sensing signal and the second sensing signal during a guard time, in which at least one of the first sensing signal and the second sensing signal has a status transition;

wherein the first driving signal is substantially identical to the second driving signal during a first period, and the first driving signal is substantially inverse to the second driving signal during a second period neighboring to the first period.

15. A signal processing method for a touch panel, comprising:

transmitting a first driving signal to a first touch channel of the touch panel to generate a first sensing signal; and transmitting a second driving signal to a second touch channel of the touch panel to generate a second sensing signal, wherein the second touch channel is neighboring to the first touch channel; and generating a differential signal according to a difference between the second sensing signal and the first sensing signal, and demodulating the differential signal;

wherein the first driving signal is substantially identical to the second driving signal during a first period, and the first driving signal is substantially inverse to the second driving signal during a second period neighboring to the first period.

16. The signal processing method of claim 15, wherein the length of the first period is equal to the length of the second period.

* * * * *